Feb. 4, 1947.　　　　G. E. DATH　　　　2,415,163

FRICTION SHOCK ABSORBER

Filed Feb. 10, 1944

Inventor
George E. Dath
By Henry Fuchs.
Atty.

Patented Feb. 4, 1947

2,415,163

UNITED STATES PATENT OFFICE 2,415,163

FRICTION SHOCK ABSORBER

George E. Dath, Chicago, Ill., assignor to W. H. Miner, Inc., Chicago, Ill., a corporation of Delaware Application February 10, 1944, Serial No. 521,785

7 Claims. (Cl. 267—9)

This invention relates to improvements in friction shock absorbers, especially designed for snubbing or dampening the action of the springs of railway car trucks.

One object of the invention is to provide a friction shock absorber adapted to replace one or more of the spring units of a truck spring cluster of a railway car for snubbing the action of said cluster.

Another object of the invention is to provide a friction shock absorber of the character indicated, comprising relatively sliding friction elements, including a tapered friction post and friction shoes embracing the post and slidable thereon, wherein the frictional contact is maintained by spring means which yieldingly opposes separation of the shoes by the tapered post and yieldingly resists relative movement of the post and shoes lengthwise with respect to each other.

A more specific object of the invention is to provide a shock absorber, as set forth in the preceding paragraph, wherein the shoes are provided with foot members which support the shoes for tilting movement, and the spring means bears on a follower ring which exerts pressure on the foot members of the shoes to resist the tilting movement of the shoes produced by the spreading action of the tapered post.

Other objects of the invention will more clearly appear from the description and claims hereinafter following.

Figure 1:
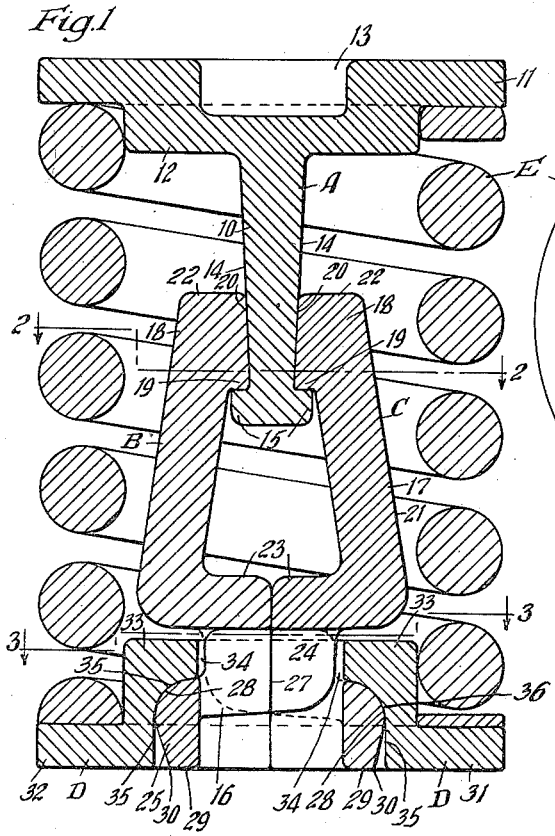
Figure 2:
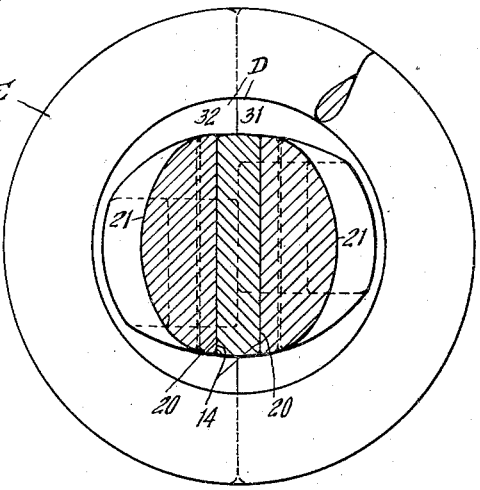
Figure 3:
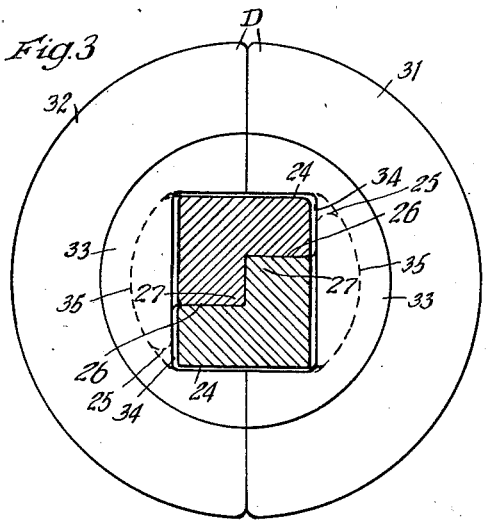
Figure 4:
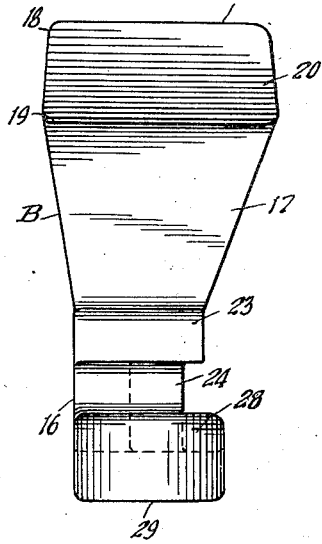

In the drawing forming a part of this specification, Figure 1 is a transverse vertical sectional view of my improved shock absorber. Figures 2 and 3 are horizontal sectional views, corresponding respectively to the lines 2—2 and 3—3 of Figure 1, the spring resistance being omitted in Figure 3. Figure 4 is an elevational view of the left hand shoe in Figure 1, looking from right to left in said figure.

My improved friction shock absorber comprises broadly a friction post A; two friction shoes B and C; a spring follower ring D; and a spring E.

The friction post A comprises a relatively wide, platelike portion 10, which forms the post member proper, having a laterally projecting, annular flange 11 at the upper end, which is in the form of a heavy disc having a downwardly offset, central portion 12, which is formed with a central depression or recess 13, adapted to receive the usual spring centering projection of the top spring plate for the truck spring cluster of the railway car. The plate 10, which forms the post proper, depends from the disclike portion 11 and is tapered downwardly, as clearly shown in Figure 1, thus presenting flat friction surfaces 14—14 on opposite sides thereof, which converge toward each other in downward direction. At the bottom end, the post is provided with laterally, outwardly projecting, heavy flanges 15—15 at the friction surface sides thereof, forming, in effect, a head member presenting upwardly facing, horizontal stop shoulders.

The two friction shoes B and C are of identical design, each shoe comprising an upwardly extending, inwardly inclined arm 17 and a base member 16 at the lower end of the arm. The arm 17 is laterally, inwardly enlarged at its upper end, as indicated at 18, thereby providing a downwardly facing, horizontal stop shoulder 19. On the inner side, the enlargement of the arm of each shoe is provided with a flat friction surface 20 engaged with the friction surfaces 14 at the corresponding side of the post A and correspondingly inclined thereto. The outer side of the arm 17 is transversely rounded, or curved, as indicated at 21. At the upper end, each arm has a flat, transverse abutment face 22, adapted to engage with the offset 12 of the platelike section of the post A to limit relative approach of the post and shoes in lengthwise direction.

The base member 16 of each shoe comprises a horizontally disposed, inwardly extending section 23 at the lower end of the arm 17, a horizontally disposed section 24 extending from the section 23 and downwardly offset with respect to the latter and terminating in a depending foot portion 25. The sections 24—24 of the two shoes B and C are angularly cut out, as indicated at 26 in Figures 3 and 4, so as to interfit, said cut out portions providing transverse shoulders 27—27 on said shoes, respectively, which lie in the central transverse vertical plane of the post A. These shoulders prevent separation of the shoes at their base portions laterally outwardly away from each other. The foot portion 25 of each shoe extends laterally beyond the inner side of the cut out portion of the section 24 of the base portion 16, as clearly seen in Figures 3 and 4, and has a rounded bearing surface 28 at the upper outer side thereof, for a purpose hereinafter described. The foot 25 is tapered in downward direction and presents a substantially flat, bottom, end face 29. The corner at the outer side of the face 29 forms a fulcrum 30 on which the foot 25 is adapted to rock or pivot. The spring follower plate or ring D comprises two like sections 31 and 32, each section being of substantially semicircular form. Each section 31 and 32 has an upwardly offset portion 33, said offset portions 33—33 of the two sections together forming a centrally disposed, hollow, cylindrical boss on the spring follower plate D. Each offset 33 is angularly recessed at the inner side, as indicated at 34, the recesses 34—34 of the two sections 31 and 32 of the follower plate D together defining a rectangular opening at the center of said follower. The inner side of each offset 33 is undercut at said opening of the follower to provide a bearing seat 35 for the foot 25 of the corresponding shoe B or C, said seat having a downwardly and inwardly facing, rounded bearing surface 36 engaging over the rounded bearing surface 28 of said foot.

In the assembled condition of the shock absorber, the two shoes B and C are disposed at opposite sides of the post A with their base portions 16—16 interengaged, as shown in Figures 1 and 3, and the split follower plate D is engaged over the foot members 25—25 of said shoes with the rounded bearing surfaces 36—36 engaging the surfaces 28—28 of the members 25—25. As will be evident, the split follower plate D thus rests both on the members 25—25, and the support on which the members 25—25 are fulcrumed, which support, in the present instance, is the lower spring plate of the truck spring cluster of a railway car.

The spring E comprises a heavy coil surrounding the post A and shoes B and C, bearing at its top and bottom ends, respectively, on the platelike section 11 of the post A and the spring follower plate or ring D. The spring E is preferably under initial compression.

My improved shock absorber is substituted for one or more of the spring units of a truck spring cluster, being interposed between the usual top and bottom spring plates of said cluster, the platelike base section 11 of the post A bearing on the top spring plate, and the foot members of the shoes B and C and the follower plate D resting on the bottom spring plate.

In assembling the parts of my improved shock absorber, the shoes are first connected with each other by interengaging the base portions thereof. The sectional follower ring or plate D is then engaged around the base portions of the shoes with the seats 35—35 engaged over the foot portions 25—25 of said shoes with the bearing surfaces 36—36 of said seats resting on the bearing surfaces 28—28 of said foot portions 25—25. The spring E is next placed around the post and shoes and seated on the follower plate D. The post A is then applied by inserting the same downwardly within the coil of the spring E and entering the same between the shoes B and C, which are temporarily spread apart at their upper ends to admit the enlarged head portion of the post therebetween. The post is forced downwardly until the stop flanges 15—15 pass beyond the shoulders 19—19 of the shoes and engage underneath said shoulders. The parts are thus brought to the completely assembled condition shown in Figure 1, with the shoulders 19—19 overhanging the flanges 15—15 of the post, thus limiting lengthwise separation of the post and shoes and holding the mechanism assembled.

The operation of the improved shock absorber is as follows: Upon the cluster of springs of the railway car truck being compressed between the spring follower plates of the truck springs, the friction post A and the friction shoes B and C are moved relatively toward each other in lengthwise direction, against the resistance of the spring E. Due to the taper of the post, the cooperating ends of the shoes are spread apart and the shoes tilted on their foot portions 25—25 fulcruming at the edges 30—30 thereof on the lower spring follower plate of the spring cluster. This tilting movement of the shoes is resisted by the spring E, which bears on the plate or ring D, which, in turn, bears on the upper sides of the foot members of the shoes. The required frictional resistance to snub the action of the truck springs is thus produced between the friction surfaces of the post and shoes. Upon the spring follower plates of the truck springs being moved apart during recoil of said springs, the expansive action of the spring E restores all of the parts to the normal release position shown in Figure 1, separation of the post and shoes in lengthwise direction being limited by engagement of the stop flanges 15—15 of the post with the shoulders 19—19 of the shoes.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a friction post; of friction shoes at opposite sides of the mechanism, said shoes embracing said post at opposite sides, each of said shoes having an integral base portion at the side of the mechanism opposite to which the shoe is disposed and supported for pivotal movement at said last named side of the mechanism, said post and shoes being movable lengthwise with respect to each other; a follower bearing on said shoes above the pivots thereof; and spring means opposing relative longitudinal movement of said post and shoes toward each other, said spring means yieldingly forcing said follower against said shoes to resist swinging movement of the latter away from said post.

2. In a friction shock absorber, the combination with a tapered friction post; of interengaged friction shoes embracing said post at opposite sides, each shoe having a friction surface engaging one side of the post, and a laterally projecting base portion, said base portion extending away from the friction surface side of the shoe to the opposite side of the mechanism, and having a depending foot portion fulcrumed at its lower end, said post and shoes being movable lengthwise with respect to each other, said post and shoes having shouldered engagement with each other to limit relative longitudinal separation of the same; a follower bearing on said shoes above the fulcrums thereof; and spring means reacting between said follower and post to oppose relative longitudinal movement of said shoes and post toward each other and yieldingly resist rocking of the shoes away from said post.

3. In a friction shock absorber, the combination with a tapered friction post; of friction shoes respectively having upstanding portions embracing said post at opposite sides, each of said shoes having a laterally projecting base portion extending laterally inwardly from said upstanding portion and having a depending foot portion at its extremity mounted for rocking movement at its lower end, said shoes and post being movable lengthwise toward each other; a follower ring having camming engagement with the base portions of said shoes; and spring means opposing relative longitudinal movement of said shoes and post toward each other, said spring means bearing on the follower ring to yieldingly resist outward swinging movement of said shoes away from said post.

4. In a friction shock absorber, the combination with a tapered friction post; of tiltable friction shoes embracing said post at opposite sides, each shoe having a base portion extending laterally therefrom toward the center line of said post and beyond the same, said base portions having depending foot members at their extremities fulcrumed at their lower ends, said shoes and post being slidable lengthwise with respect to each other; a spring follower having camming engagement with said shoes to resist tilting thereof away from said post; and spring means opposing relative movement of the shoes and post toward each other in lengthwise direction, said spring means bearing on said spring follower to yieldingly resist tilting movement of the shoes.

5. In a friction shock absorber, the combination with a tapered friction post; of tiltable friction shoes embracing said post at opposite sides, each shoe having a base portion projecting laterally outwardly away from said shoe toward the center line of the post and beyond the same, said base portions having depending foot members rockably supported at their lower ends, said shoes and post being slidable lengthwise with respect to each other; a follower ring having camming engagement with said base portions of the shoes to oppose separation of the same; and spring means opposing relative movement of the shoes and post in lengthwise direction toward each other, said spring bearing on said follower ring to yieldingly resist camming action of the shoes and ring and tilting movement of said shoes.

6. In a friction shock absorber, the combination with a top follower member; of a tapered post depending from said member; a pair of friction shoes embracing said tapered post at opposite sides, each shoe having an upstanding section and a base portion extending laterally from said upstanding section toward the center line of said post and beyond the same, each shoe having a depending foot at the outer end of its base portion, said foot portion being fulcrumed at its lower end, said shoes and post being slidable with respect to each other in lengthwise direction; a cam member bearing on the base portions of said shoes; and spring means surrounding said shoes and post and bearing at its opposite ends on the follower member and the cam member, said spring means opposing relative longitudinal movement of said post and shoes toward each other and tilting movement of the shoes away from said post.

7. In a friction shock absorber, the combination with a tapered friction post having laterally projecting stop flanges at its lower end; of tiltable friction shoes at opposite sides of the mechanism embracing said post at opposite sides, each shoe having a shoulder overhanging the stop flange at the corresponding side of the post to limit relative separation of the shoes and post in lengthwise direction, each shoe having a base portion projecting laterally away from said shoe toward the opposite side of the mechanism, and a foot depending from said base portion and fulcrumed at its lower end, said shoes and post being slidable lengthwise with respect to each other; a two piece follower plate embracing said base portions of said shoes and having camming engagement with the foot portions thereof; and spring means opposing relative movement of the shoes and post in lengthwise direction toward each other, said spring means bearing on the two piece follower plate to oppose camming action between said shoes and follower plate and thereby resist tilting movement of the shoes away from said post.

GEORGE E. DATH.

REFERENCES CITED

The following references are of record in the file of this patent:

UNITED STATES PATENTS

| Number | Name | Date |
| --- | --- | --- |
| 1,442,893 | Lewis | Jan. 23, 1923 |
| 1,644,391 | Mitchell | Oct. 4, 1927 |
| 2,073,761 | Shafer | Mar. 16, 1937 |
| 2,223,656 | Bachman | Dec. 3, 1940 |

FOREIGN PATENTS

| Number | Country | Date |
| --- | --- | --- |
| 4120–1913 | British | Feb. 18, 1914 |